United States Patent
Naseer et al.

(10) Patent No.: US 11,941,892 B2
(45) Date of Patent: Mar. 26, 2024

(54) METHOD AND DEVICE FOR PROVIDING DATA FOR CREATING A DIGITAL MAP

(71) Applicant: Robert Bosch GmbH, Stuttgart (DE)

(72) Inventors: Tayyab Naseer, London (GB); Piyapat Saranrittichai, Nuremberg (DE); Carsten Hasberg, Ilsfeld-Auenstein (DE)

(73) Assignee: ROBERT BOSCH GMBH, Stuttgart (DE)

(*) Notice: Subject to any disclaimer, the term of this patent is extended or adjusted under 35 U.S.C. 154(b) by 240 days.

(21) Appl. No.: 17/447,334

(22) Filed: Sep. 10, 2021

(65) Prior Publication Data
US 2022/0083792 A1 Mar. 17, 2022

(30) Foreign Application Priority Data
Sep. 17, 2020 (DE) .......................... 102020211636.9

(51) Int. Cl.
*G06V 20/00* (2022.01)
*G06N 3/045* (2023.01)
(Continued)

(52) U.S. Cl.
CPC .......... *G06V 20/588* (2022.01); *G06N 3/045* (2023.01); *G06T 7/285* (2017.01); *G06T 7/73* (2017.01);
(Continued)

(58) Field of Classification Search
CPC .. G06V 20/588; G06V 20/582; G06V 20/647; G06V 10/82; G06V 20/56;
(Continued)

(56) References Cited

U.S. PATENT DOCUMENTS

2018/0181817 A1* 6/2018 Yan ...................... G06V 10/764
2018/0232947 A1* 8/2018 Nehmadi ................ G01S 7/295
(Continued)

FOREIGN PATENT DOCUMENTS

DE 102017108248 A1 10/2017
DE 102018109680 A1 10/2019
(Continued)

OTHER PUBLICATIONS

Yew et al., 3DFeat-Net: Weakly Supervised Local 3D Features for Point Cloud Registration, Proceedings of the European Conference on Computer Vision (ECCV), pp. 607-623 (Year: 2018).*
(Continued)

*Primary Examiner* — Ping Y Hsieh
*Assistant Examiner* — Xiao Liu
(74) *Attorney, Agent, or Firm* — NORTON ROSE FULBRIGHT US LLP; Gerard A. Messina

(57) ABSTRACT

A method for providing data for creating a digital map. The method includes: detecting surroundings sensor data of the surroundings during a measuring run of a physical system, preferably a vehicle, the surroundings sensor data capturing the surroundings in an at least partially overlapping manner, first surroundings sensor data including three-dimensional information, and second surroundings sensor data including two-dimensional information; extracting, with the aid of a first neural network situated in the physical system, at least one defined object from the first and second surroundings sensor data into first extracted data; and extracting, with the aid of a second neural network situated in the physical system, characteristic features including descriptors from the first extracted data into second extracted data, the descriptors being provided for a defined alignment of the second extracted data in a map creation process.

11 Claims, 2 Drawing Sheets

(51) Int. Cl.
  *G06T 7/285* (2017.01)
  *G06T 7/73* (2017.01)
  *G06V 20/56* (2022.01)
  *G06V 20/58* (2022.01)
  *G06V 20/64* (2022.01)

(52) U.S. Cl.
  CPC .......... *G06V 20/582* (2022.01); *G06V 20/647* (2022.01); *G06T 2207/10021* (2013.01); *G06T 2207/10028* (2013.01); *G06T 2207/20081* (2013.01); *G06T 2207/20084* (2013.01); *G06T 2207/30256* (2013.01)

(58) Field of Classification Search
  CPC ............ G06N 3/045; G06N 3/08; G06N 7/01; G06N 20/00; G06T 7/285; G06T 7/73; G06T 2207/10021; G06T 2207/10028; G06T 2207/20081; G06T 2207/20084; G06T 2207/30256; G06T 17/05; G06T 2200/04; G06T 2207/10016; G06T 2207/30252; G06T 7/579; G01S 13/865; G01S 13/867; G01S 13/931; G01S 2013/9323; G01S 7/417; G01S 7/4808; G01S 13/89; G01S 17/86; G01S 17/89; G01C 21/3804; G01C 21/3841
  See application file for complete search history.

(56) References Cited

U.S. PATENT DOCUMENTS

| | | | |
|---|---|---|---|
| 2019/0147255 | A1 | 5/2019 | Homayounfar et al. |
| 2019/0187718 | A1 | 6/2019 | Zou |
| 2020/0242373 | A1* | 7/2020 | Mei .................. G06T 7/246 |

FOREIGN PATENT DOCUMENTS

| | | |
|---|---|---|
| DE | 102018216172 A1 | 3/2020 |
| KR | 20200096408 A * | 8/2020 |

OTHER PUBLICATIONS

Cattaneo et al., CMRNet: Camera to LiDAR-Map Registration, arXiv: 1906.10109v2 Jul. 17, 2019.*

Kashif et al., Feature description with SIFT, SURF, BRIEF, BRISK, or FREAK? A general question answered for bone age assessment, Computers in Biology and Medicine, vol. 68, pp. 67-751, Jan. 2016.*

Qi et al., "Pointnet: Deep Learning On Point Sets for 3D Classification and Segmentation," In Proceedings of the IEEE Conference on Computer Vision and Pattern Recognition, 2017, pp. 652-660. <https://openaccess.thecvf.com/content_cvpr_2017/papers/Qi_PointNet_Deep_Learning_CVPR_2017_paper.pdf> Downloaded Sep. 8, 2021.

Qi et al., "Pointnet++: Deep Hierarchical Feature Learning on Point Sets in a Metric Space," 31st Conference on Neural Information Processing Systems (NIPS 2017), 2017, pp. 1-10. <https://papers.nips.cc/paper/2017/file/d8bf84be3800d12f74d8b05e9b89836f-Paper.pdf> Downloaded Sep. 8, 2021.

Yew et al., "3Dfeat-Net: Weakly Supervised Local 3D Features for Point Cloud Registration," Proceedings of the European Conference On Computer Vision (ECCV), 2018, pp. 1-17. <https://openaccess.thecvf.com/content_ECCV_2018/papers/Zi_Jian_Yew_3DFeat-Net_Weakly_Supervised_ECCV_2018_paper.pdf> Downloaded Sep. 8, 2021.

* cited by examiner

METHOD AND DEVICE FOR PROVIDING DATA FOR CREATING A DIGITAL MAP

CROSS REFERENCE

The present application claims the benefit under 35 U.S.C. § 119 of German Patent Application No. DE 102020211636.9 filed on Sep. 17, 2020, which is expressly incorporated herein by reference in its entirety.

FIELD

The present invention relates to a method for providing data for creating a digital map. The present invention relates to a device for providing data for creating a digital map. Moreover, the present invention relates to a computer program product.

BACKGROUND INFORMATION

Reliable creation of digital maps (digital mapping) is of major importance for automated methods. Computing architectures that process unstructured three-dimensional data are avaiable; these features being used for object classification tasks. Such architectures are described, for example, from the following paper:

Qi CR, Su H, Mo K, Guibas L J; "PointNet: Deep learning on point sets for 3D classification and segmentation;" in Proceedings of the IEEE Conference on Computer Vision and Pattern Recognition 2017, pp. 652-660.

SUMMARY

An object of the present invention is to provide an improved method for providing data for creating a digital map.

According to a first aspect of the present invention, the object may be achieved using a method for providing data for creating a digital map. In accordance with an example embodiment of the present invention, the method includes the following steps:
 detecting surroundings sensor data of the surroundings during a measuring run of a physical system, preferably a vehicle, the surroundings sensor data capturing the surroundings in an at least partially overlapping manner, first surroundings sensor data including three-dimensional information, and second surroundings sensor data including two-dimensional information;
 extracting, with the aid of a first neural network situated in the physical system, at least one defined object from the first and second surroundings sensor data into first extracted data; and
 extracting, with the aid of a second neural network situated in the physical system, characteristic features including descriptors from the first extracted data into second extracted data, the descriptors being provided for a defined alignment of the second extracted data in a map creation process.

For creating the digital map, data that are compressed, i.e., reduced in volume, in a defined manner are advantageously provided in this way. As a result, only fairly small data volumes are to be communicated to a map creation unit, which may advantageously save communication effort and computing time for creating the digital map. In this way, a portion of a process chain for creating a digital map is provided, which is preferably carried out on a measuring vehicle during one or multiple measuring runs.

Within the meaning of the present patent application, descriptors are pieces of semantic information that describe the particular characteristic features or the particular object.

According to a second aspect of the present invention, the object may achieved using a device for providing data for creating a digital map. In accordance with an example embodiment of the present invention, the device includes:
 a first neural network that is configured to extract at least one defined object from first and second surroundings sensor data into first extracted data, the surroundings sensor data capturing the surroundings in an at least partially overlapping manner, first surroundings sensor data including three-dimensional information, and second surroundings sensor data including two-dimensional information; and
 a second neural network that is configured to extract characteristic features including descriptors from the first extracted data into second extracted data, the descriptors being provided for a defined alignment of the second extracted data in a map creation process.

According to a third aspect of the present invention, the object may be achieved using a computer program product including program code for carrying out the provided method when it runs on a provided electronic device or is stored on a computer-readable data medium.

Advantageous refinements of the method in accordance with the present invention are disclosed herein.

One advantageous refinement of the method in accordance with the present invention provides that at least one of the following is used as first surroundings sensor data: radar data, LIDAR data, and stereo camera data, and camera data being used as second surroundings data. Different types of sensor data may thus be advantageously utilized for the provided method, it also being possible to use discretized data as three-dimensional data.

A further advantageous refinement of the method in accordance with the present invention provides that defined inaccuracy ranges of the supplied data are used as input data for the neural networks. In this way, further parameters may advantageously be provided as input data for the first neural network, for example with the aid of a Gaussian mixed model. This additional parameter is useful in particular for radar data, since for this type of data the point cloud data are generally less accurate than for corresponding LIDAR data.

A further advantageous refinement of the method in accordance with the present invention provides that the characteristic features and the descriptor define the ascertained object in greater detail. This advantageously assists in allowing the second extracted data to be aligned with one another even more easily in the subsequent map creation process.

A further advantageous refinement of the method in accordance with the present invention provides that the descriptor defines a dimensional indication of the characteristic feature. In this way, a more detailed specification of the characteristic features may advantageously be carried out, which may efficiently reduce a data volume to be communicated for the map creation.

A further advantageous refinement of the method in accordanc with the present invention provides that the surroundings sensor data are provided from different runs of the physical system and/or to a physical system at different points in time. The fact that characteristic features may look different at different times and from different detection vehicles is thus advantageously taken into account. In this way, the alignment or adaptation of the characteristic features in the process of the map creation from a large data volume is advantageously possible in an efficient manner.

A further advantageous refinement of the method in accordance with the present invention provides that the at least one extracted object is one of the following: a lane marking, a traffic sign, a lane, a zebra crossing, a road sign, or a building. In this way, different specific features of the surroundings may advantageously be taken into account for creating the digital map.

A further advantageous refinement of the method in accordance with the present invention provides that the second extracted surroundings sensor data are communicated to a map creation unit. In this way, a data volume for creating the digital map that is reduced compared to the related art may advantageously be communicated to the map creation unit.

A further advantageous refinement of the method in accordance with the present invention provides that the first neural network is a deep convolutional neural network and the second neural network is a point cloud-based neural network. In this way, types of neural networks that are particularly well suited in each case for the specific tasks of the feature extraction are advantageously used. For extracting the characteristic features with the aid of the second neural network, it is possible to utilize, for example, the above-mentioned method according to Qi C R, Yi L, Su H, Guibas L J, "PointNet++: Deep hierarchical feature learning on point sets in a metric space;" in Advances, Neural Information Processing Systems 2017, pp. 5099-5108, or according to Yew Z J, Lee G H, "3DFeat-Net: Weakly supervised local 3D features for point cloud registration," European Conference on Computer Vision, Sep. 8, 2018, pp. 630-646. A generic feature extraction is advantageously well supported by using the stated types of neural networks.

The present invention is described in greater detail below with further features and advantages, based on three figures. All described or illustrated features, alone or in any arbitrary combination, constitute the subject matter of the present invention, regardless of their wording or illustration in the description or figures, respectively.

Provided features and advantages of the method analogously result from provided features and advantages of the device, and vice versa.

DETAILED DESCRIPTION OF EXAMPLE EMBODIMENTS

Figure 1:
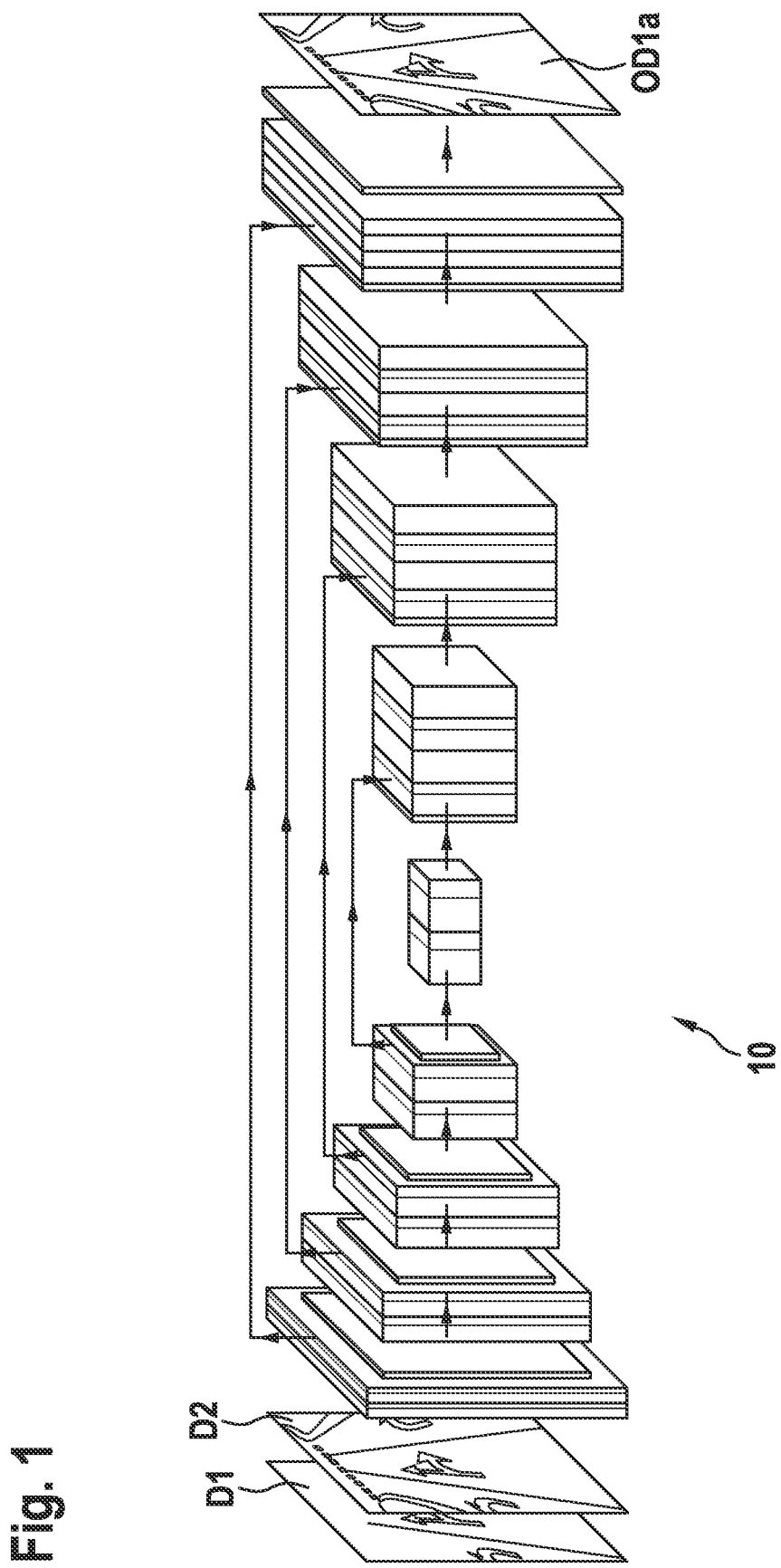
FIG. 1 shows a basic representation of a mode of operation of the first neural network for extracting object features from sensor data.

A main feature of the present invention is in particular an improved method for providing data for creating a high-resolution digital map, in particular for the purpose of automated driving for at least semi-automated vehicles.

In the following discussion, the term "automated vehicle" is used synonymously with the terms "fully automated vehicle," "autonomous vehicle," and "semi-autonomous vehicle."

By use of one or multiple measuring vehicles, in one or multiple measuring runs a detection of surroundings data by sensor is carried out with the aid of a surroundings sensor device, it being possible to use, for example, a LIDAR sensor and/or a radar sensor for detecting three-dimensional surroundings sensor data D1, and a camera for detecting two-dimensional surroundings sensor data D2, as surroundings sensor devices.

The detected surroundings sensor data represent descriptions of different sections of the surroundings of the vehicle, and are used for creating a map representation of the surroundings. A map representation of the surroundings of the vehicle may be achieved by combining multiple sets of surroundings sensor data that describe various sections of the surroundings, so that a continuous, contiguous map representation of the surroundings, made up of a plurality of combined sets of surroundings sensor data of adjoining sections of the surroundings of the vehicle, may be achieved.

For combining surroundings sensor data which in each case represent a description of adjoining sections of the surroundings, the particular sets of surroundings sensor data may be joined to one another in such a way that overlapping areas of two adjoining sets of surroundings sensor data in each case, in which identical sections of the surroundings are represented, are brought into congruence. Overlapping areas may be made up of individual measuring points.

A map representation and in particular a combination of various sets of surroundings sensor data presumes that sets of surroundings sensor data that are to be combined or joined to one another are aligned with one another, so that a contiguous map representation of the surroundings may be achieved by joining the sets of surroundings sensor data. An alignment of various sets of surroundings sensor data compensates for the fact that the particular surroundings sensors may have different alignments with respect to the surroundings for different sets of surroundings sensor data, which, for example, may be recorded at different times by a vehicle and/or by different vehicles.

A method is provided for providing data for the map creation, which provides an alignment of three-dimensional point clouds, using features that are extracted from specific surroundings features (for example, lane markings, traffic signs, buildings, etc.) with the aid of two neural networks 10, 20. The underlying raw data are provided in the form of two-dimensional surroundings sensor data D2 (camera data, for example) and in the form of three-dimensional surroundings sensor data D1 (LIDAR data, radar data, for example) and supplied to first neural network 10.

The following advantages in particular result from use of the provided data preparation process:

By use of the method according to the present invention, a data transfer rate may advantageously be significantly reduced in that, for aligning two point clouds with one another, only one alignment of two subsets of the two point clouds is carried out, on the basis of which an alignment of the two complete point clouds is made possible. As the result of considering the two subsets of the two point clouds, each of which has a much smaller data volume than the respective point clouds, the data volume to be communicated, which is to be processed and thus joined, may be substantially reduced. As a result, a bandwidth that is required for communicating the data necessary for the map creation is greatly reduced, and is thus more cost-effective.

Reduction of subsequent computation costs: The processing of smaller data volumes may significantly reduce the costs of creating the digital map with the aid of a subsequent map creation unit.

Improved object features: The characteristic features of a detected object ascertained by neural networks and the subsequently ascertained characteristic points of the point cloud, which correspond to the particular features of the object, may be determined more precisely than characteristic points of a point cloud that have been ascertained manually. In this way, a more exact alignment of two point clouds, based on an alignment of the characteristic points of the two point clouds with one another, may be achieved. A manual ascertainment of characteristic points may be achieved with the aid of appropriate software tools which allow the user to mark individual points of a point cloud as characteristic points, on the basis of which an alignment of multiple point clouds, in which characteristic points are marked in each case, may be achieved.

Increased robustness: The combination of three-dimensional surroundings sensor data with two-dimensional surroundings sensor data (LIDAR data and image data, for example) for semantic purposes in the sense of machine learning advantageously results in a combination of favorable effects. The degree of reflection of the LIDAR data is, for example, robust against changing light conditions, and the texture-rich information from RGB camera data supports laser data, for example with well-illuminated surroundings conditions.

FIG. 1 shows a schematic mode of operation of one step of the provided method. It is apparent that three-dimensional surroundings sensor data D1 (for example, LIDAR data, radar data, stereo camera data, etc.) and two-dimensional surroundings sensor data D2 (camera data, for example) that are associated with one another in a defined manner (for example, by the corresponding surroundings sensors detecting a surroundings section of the vehicle with at least partial overlap or being achieved by a projection of the LIDAR measurements onto an image plane of the camera) are supplied to a first neural network 10 situated in the measuring vehicle.

Three-dimensional surroundings sensor data D1 may be combined as measured values of LIDAR sensors in three-dimensional point clouds, each representing a description of the surroundings of the vehicle. Two-dimensional surroundings sensor data D2 may be, for example, two-dimensional image recordings of the surroundings of the vehicle that are recorded with the aid of an appropriate camera system. Two-dimensional surroundings data D2 may in particular include red, green, blue (RGB) data.

The combination of LIDAR data and image data or RGB camera data allows a precise map representation of the surroundings. RGB camera data allow the most detailed description possible of the surroundings, and the ascertainment of individual objects of the surroundings. LIDAR data also provide precise distance information concerning the objects in the surroundings.

The method according to the present invention is described below based on one exemplary embodiment. The method is not to be construed as limited to the example described below.

LIDAR data in the form of a three-dimensional point cloud of three-dimensional surroundings sensor data D1 and image data in the form of a two-dimensional image recording of two-dimensional surroundings sensor data D2 from the surroundings of a vehicle to be mapped are recorded in a first step of the method. For this purpose, the vehicle is equipped with appropriate surroundings sensors and may be present on a measuring run in question, during which a plurality of sets of three-dimensional surroundings sensor data D1 and two-dimensional surroundings sensor data D2 are recorded in a predetermined time period.

A projection of a three-dimensional point cloud of three-dimensional surroundings sensor data D1 onto a two-dimensional image recording of two-dimensional surroundings sensor data D2 is carried out in a further step of the method. For this purpose, the three-dimensional point cloud of three-dimensional surroundings sensor data D1 and the two-dimensional image recording of two-dimensional surroundings sensor data D2 are recorded at the same time, i.e., describe an identical detail of the surroundings of the vehicle.

Due to the projection of the three-dimensional point cloud of three-dimensional surroundings sensor data D1 onto the two-dimensional image recording of two-dimensional surroundings sensor data D2, one pixel of the two-dimensional image recording may be associated with each point of the three-dimensional point cloud.

The stated association or the projection of three-dimensional surroundings sensor data D1 onto the image recording of two-dimensional surroundings sensor data D2 may be achieved, for example, with the aid of a well-calibrated LIDAR system and camera system. The data of both sensors are thus combined in an individual tensor for the purpose of further object segmentation based on first neural network 10.

FIG. 1 shows in a strictly schematic manner a structure for carrying out a further step of the method in provided first neural network 10, with numerals qualitatively defining layer depths or layer structures of first neural network 10. As a result, the intent is thus only to indicate that trained first neural network 10 generates from supplied surroundings sensor data D1, D2 first extracted data OD1$a$ ... OD1$n$, which specify a defined feature (in the form of a lane marking, for example) obtained from surroundings sensor data D1, D2. In this way, it is known by each point of the three-dimensional LIDAR point cloud whether or not it is associated with an object (a traffic lane, for example).

For this purpose, an object in the surroundings is recognized by first neural network 10 in a further step of the method, based on the two-dimensional image recording of two-dimensional surroundings sensor data D2. In the present example, the recognized object is a roadway or a road surface on which the vehicle is moving. Alternatively, some other object may be selected. An object that is contained in all recorded image recordings is preferably selected. Roadway boundaries or similar objects that are consistently ascertainable in all recordings are a suitable alternative to the road surface.

Based on the previously carried out projection of the three-dimensional point cloud of three-dimensional surroundings sensor data D1 onto the two-dimensional image recording of two-dimensional surroundings sensor data D2, the points of the three-dimensional point cloud of three-dimensional surroundings sensor data D1 that represent the recognized object in the three-dimensional point cloud of three-dimensional surroundings sensor data D1 may be determined by first neural network 10 selecting the pixels of the two-dimensional image representation of two-dimensional surroundings sensor data D2 that represent the recognized object, i.e., the road surface. The points that represent the recognized object in the three-dimensional point cloud of three-dimensional surroundings sensor data D1 correspond to the points of the three-dimensional point cloud of three-dimensional surroundings sensor data D1 that are projected by the projection into the pixels of the two-dimensional image recording of two-dimensional surroundings sensor data D2 that describe the recognized object. Thus, by selecting the particular pixels of the two-dimensional image recording of two-dimensional surroundings sensor data D2, a selection of the points is achieved which represents the recognized object in the three-dimensional point cloud of three-dimensional surroundings sensor data D1.

For this purpose, the points of the three-dimensional point cloud of three-dimensional surroundings sensor data D1, which describe the recognized object, are provided with the value 1, while the remaining points of the three-dimensional point cloud of three-dimensional surroundings sensor data D1 are associated with the numerical value 0.

A subset of the three-dimensional point cloud of three-dimensional surroundings sensor data D1 may thus be ascertained which contains the points that describe the recognized object. The ascertainment of the subset of the points of the three-dimensional point cloud of three-dimensional surroundings sensor data D1 may be carried out by the first neural network. Alternatively, a suitable selection algorithm may be used.

The ascertained subset of points of the three-dimensional point cloud of three-dimensional surroundings sensor data D1, which describe the recognized object, includes first extracted data OD1a ... OD1n that correspond to the points of the three-dimensional point cloud of three-dimensional surroundings sensor data D1 of the ascertained subset.

First neural network 10 may be designed as a deep convolutional network, and may be trained to recognize objects in question, in the present example road surfaces, in image recordings, and optionally to ascertain the particular pixels of the image recording via which the recognized object is represented.

In a further method step, a second neural network 20 is applied to first extracted data OD1a ... OD1n, i.e., to the points of the ascertained subset of the three-dimensional point cloud of three-dimensional surroundings sensor data D1 which describe the recognized object, i.e., the recognized road surface. Second neural network 20 is trained to determine characteristic points of the object that is recognized by first neural network 10. Characteristic points of the recognized object may be points of a border of the object, such as corner points. In the present specific embodiment, in which a road surface is recognized as the recognized object, the characteristic points may be points of a roadway boundary and/or points of corresponding lane markings.

In addition to ascertaining the characteristic points, the second neural network also delivers a descriptor, which includes semantic information concerning the ascertained characteristic point, for each of the ascertained characteristic points of the ascertained object, i.e., the road surface. The descriptor may include, for example, information concerning the orientation of the point within the recognized object, or information concerning to which portion of the recognized object a particular point belongs. In the present example, the descriptor may indicate, for example, to which lane marking the particular point belongs. In addition, further information, for example which additional points belong to the same lane marking, may be contained in the particular descriptor. Alternatively, additional information that differs from that described here may be included in each descriptor.

The second neural network may be designed as a neural network that is configured to process point clouds, in particular three-dimensional point clouds, as input data. Various solutions are available in the related art:

Qi CR, Yi L, Su H, Guibas L J, "PointNet++: Deep hierarchical feature learning on point sets in a metric space," Advances in Neural Information Processing Systems 2017, pp. 5099-5108.

In addition, second neural network 20 in a corresponding training process is trained to recognize characteristic points of objects in three-dimensional point clouds that describe a characteristic feature of the particular object and provide them with appropriate semantic information. For this purpose, in the training process second neural network 20 may be trained on training data in the form of three-dimensional point clouds of objects, in the training data appropriate characteristic points being marked, and the particular points or the features of the object represented by the characteristic points being provided as applicable with appropriate descriptors in the form of semantic information. In the described example, second neural network 20 may be trained with training data in the form of three-dimensional point clouds of road surfaces including markings and boundaries and corresponding characteristic points.

The characteristic points of the recognized object ascertained in the method by second neural network 20 may be combined as a subset of first extracted data OD1a, ..., OD1n as second extracted data OD2a, ..., OD2n.

For various two-dimensional image recordings of two-dimensional surroundings sensor data D2 and the corresponding three-dimensional point clouds of three-dimensional surroundings sensor data D1, each of which are recorded for adjoining sections of the surroundings of the vehicle to be mapped, in each case an identical object, for example the road surface on which the vehicle travels and which is thus imaged in each of the particular image recordings, is recognized and corresponding first extracted data OD1a, ..., OD1n are determined, which in each case represent the subset of points of the three-dimensional point clouds of three-dimensional surroundings sensor data D1, which in the three-dimensional point clouds of three-dimensional surroundings sensor data D1 correspond to the recognized object.

Second extracted data OD2a, ..., OD2n in the form of characteristic points of the ascertained object may be ascertained from first extracted data OD1a, ..., OD1n. By recording identical characteristic points of the recognized object in the form of second extracted data OD2a, ..., OD2n for the various sets of first extracted data OD1a, ..., OD1n of the various three-dimensional point clouds of the three-dimensional surroundings sensor data, for each of the multiple three-dimensional point clouds of three-dimensional surroundings sensor data D1 there is a set of data points that may be used as reference points for an alignment of the multiple three-dimensional point clouds of three-dimensional surroundings sensor data D1 with one another, since corresponding points are contained in the further three-dimensional point clouds for each of these data points.

For aligning the various three-dimensional point clouds of three-dimensional surroundings sensor data D1 with one another, it is thus sufficient to achieve an alignment of the various sets of second extracted data OD2a, ..., OD2n. By bringing the mutually corresponding characteristic points of the various sets of second extracted data OD2a, ..., OD2n into congruence, i.e., achieving an alignment of these points of various three-dimensional point clouds, an alignment of the particular three-dimensional point clouds of three-dimensional surroundings sensor data D1 with one another is achieved at the same time. Thus, for aligning various three-dimensional point clouds, only the substantially smaller sets of second extracted data OD2a, ..., OD2n from the data volume must be taken into account.

An alignment of the multiple sets of second extracted data OD2a, ..., OD2n may be carried out using a suitable alignment algorithm, for example the RANSAC algorithm.

Figure 2:
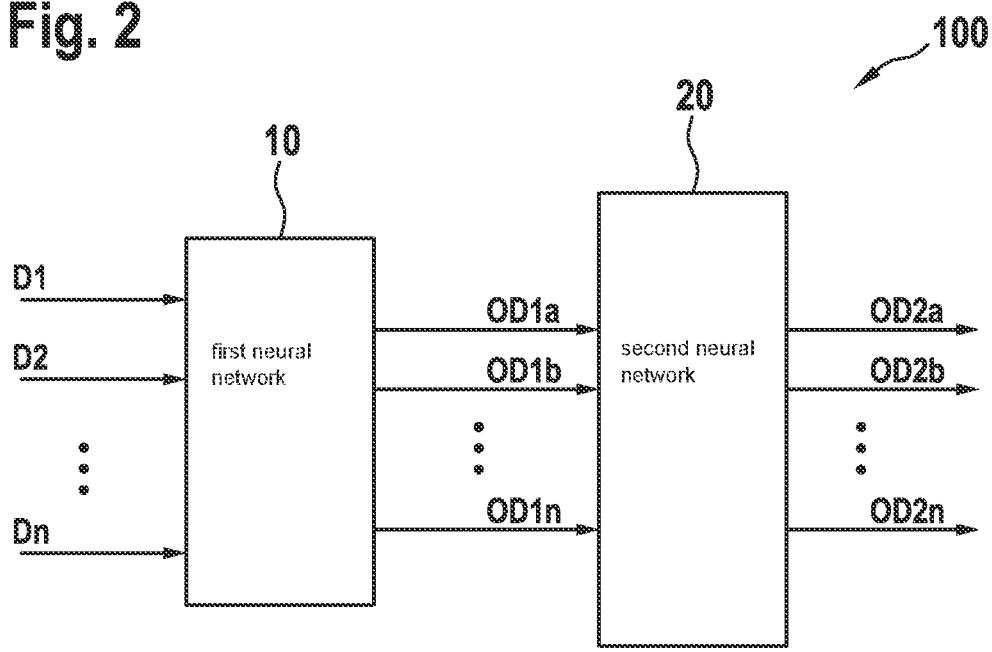
FIG. 2 shows a basic block diagram of a provided electronic device for carrying out the provided method in accordance with an example embodiment of the present invention.

FIG. 2 shows a basic block diagram of a provided electronic device 100 for providing data for creating a high-resolution digital map (not illustrated).

It is indicated in FIG. 2 that first extracted data OD1a ... OD1n are supplied to second neural network 20 in the form of object point cloud data, which from each object point cloud of first extracted data OD1a ... OD1n the second neural network extracts second extracted data OD2a ... OD2n together with corner points or characteristic points and associated descriptors.

The corner points or characteristic points define the extracted object in greater detail (for example, coordinates of the object such as middle, center, edge of a lane, etc.). The extracted object may be described in even greater detail (for example, in the form of a dimensional indication of the object) with the aid of the descriptor; it may be assumed that descriptors of the same object are at least similar, ideally identical. The descriptor may specify, for example, a dimensional indication of a characteristic feature, for example in the form of a vector. Extracted second data OD2a ... OD2n are now communicated, preferably wirelessly or via radio, to a map creation unit (not illustrated), which may be situated in the cloud, for example.

In a subsequent map creation process it is easily possible, with the aid of the characteristic features and the descriptors of second extracted data OD2a ... OD2n, to align second extracted data OD2 with one another, and thus create the high-resolution digital map with little data complexity.

In this way, with the aid of the map creation unit an alignment of stated second extracted data OD2a ... OD2n is thus carried out, using the particular descriptors. The stated alignment of stated second extracted data OD2a ... OD2n may be carried out, for example, with the aid of a random sample consensus (RANSAC)-based transformation which carries out a robust 6-DOF transformation using second extracted data OD2a ... OD2n. A 6-DOF transformation includes 3 degrees of freedom (DOFs) of the translation and 3 degrees of freedom (DOFs) of the rotation. In the process, frames of the data are transformed into one another with the aid of a 6-DOF transformation. The RANSAC method provides a compensation between the individual data sets of second extracted data OD2a ... OD2n, which may thus be efficiently utilized for creating the digital map.

The provided method may be carried out by an individual measuring vehicle at different points in time or also by multiple measuring vehicles, as the result of which a variety of extracted data OD1a ... OD1n, OD2a ... OD2n may be provided.

In scenarios in which no suitable objects can be extracted from the surroundings sensor data, a fallback strategy may be, for example, to utilize complete surroundings sensor data. In order to efficiently manage the surroundings sensor data in this case, downsampling of the data may be provided in advance.

The provided method is also possibly carried out using three-dimensional surroundings sensor data in the form of compressed radar data clouds. For example, raw radar data that are represented as a Gaussian mixed model may be compressed and clustered. In this case, spatial positions of the cluster are used as 3D positions, the average value and the covariance being used as features of these points that represent a certain uncertainty, and being supplied to first neural network 10 as further parameters for extracting first extracted data OD1a ... OD1n.

Training processes for stated neural networks 10, 20 preferably take place offline with the aid of suitable training data, in which an individual learning objective to be achieved in the training is defined for each neural network 10, 20. First neural network 10 is preferably designed as a deep convolutional network, and second neural network 20 is preferably designed as a point cloud-based neural network, for example a PointNet$^{++}$. Appropriate learning objectives are defined, the training of neural networks 10, 20 being carried out until the particular learning objective is achieved.

The provided method is preferably carried out completely in the vehicle, using the two neural networks 10, 20.

Although the method has been described above using objects in the form of traffic lanes or road surfaces, it is of course also possible to extract different or additional objects from surroundings sensor data D1, D2, for example in the form of roadway boundaries, traffic signs, buildings, etc.

The provided method is thus preferably independent of specific feature types, and of the dimensionality of the supplied surroundings sensor data.

The method according to the present invention may advantageously be implemented as software which runs, for example, on device 100 in the vehicle. Simple adaptability of the method is supported in this way.

Figure 3:
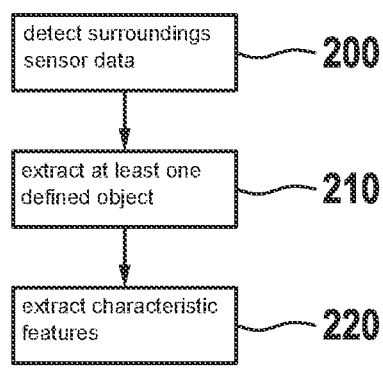
FIG. 3 shows a basic sequence of one specific embodiment of the provided method in accordance with the present invention.

FIG. 3 shows a basic sequence of a provided method in a highly schematic manner.

A detection of surroundings sensor data D1, D2 of the surroundings takes place during a measuring run of a physical system, preferably a vehicle, in a step 200, surroundings sensor data D1, D2 capturing the surroundings in an at least partially overlapping manner, first surroundings sensor data D1 including three-dimensional information, and second surroundings sensor data D2 including two-dimensional information.

An extraction of at least one defined object from first and second surroundings sensor data D1, D2 into first extracted data OD1 is carried out in a step 210, with the aid of a first neural network 10 situated in the physical system.

Lastly, an extraction of characteristic features into second extracted data OD2 takes place in a step 220, using descriptors from first extracted data OD1 with the aid of a second neural network 20 situated in the physical system, the descriptors being provided for a defined alignment of second extracted data OD2 in a map creation process.

Those skilled in the art will appropriately modify and/or combine the features of the present invention with one another without departing from the features of the present invention.

What is claimed is:

1. A method for providing data for creating a digital map, comprising the following steps:
obtaining surroundings sensor data captured in an overlapping manner during a measuring run of a physical system, the surroundings sensor data including:
first surroundings sensor data, which represents surroundings of the physical system as a first three-dimensional, cloud of points; and
second surroundings sensor data, which represents the surroundings of the physical system as a two-dimensional arrangement of pixels;
registering the first surroundings sensor data to the second surroundings sensor data so that each of the points of the cloud of the first surroundings sensor data is associated with a respective one of the pixels;
using a first neural network:
processing the first surroundings sensor data to identify a subset of the pixels of the second surroundings sensor data corresponding to a predefined object; and
based on the registration, selecting a subset of the points of the cloud of the first surroundings sensor data corresponding to the subset of the pixels, the selected subset of the points forming a three-dimensional representation of the predefined object;
extracting, using a second neural network:
a subset of the subset of the points corresponding to one or more characteristic features of the predefined object; and
descriptors of the one or more characteristic features;
based on the descriptors, aligning the subset of the subset of the points with a subset of another subset of points, which is of a second in three-dimensional cloud of points; and
based on the alignment of the subset of the subset of the points with the subset of the another subset of points, stitching the first and second three-dimensional clouds of points to each other, thereby creating at least a part of a three-dimensional map.

2. The method as recited in claim 1, wherein the physical system is a vehicle.

3. The method as recited in claim 1, wherein at least one of the following is used as the first surroundings sensor data: radar data, and/or LIDAR data, and/or stereo camera data, and wherein camera data is used as the second surroundings data.

4. The method as recited in claim 1, wherein defined inaccuracy ranges of the surroundings sensor data are used as input data for the first and second neural networks.

5. The method as recited in claim 1, wherein the characteristic features and the descriptors define details of the predefined object.

6. The method as recited in claim 5, wherein the descriptors define a dimensional indication of the characteristic features.

7. The method as recited in claim 1, wherein the first three-dimensional cloud of points and the second three-dimensional cloud of points are obtained from different runs of the physical system and/or at different points in time.

8. The method as recited in claim 1, wherein the defined object is one of the following: a lane marking, a traffic sign, a lane, a zebra crossing, a road sign, and a building.

9. The method as recited in claim 1, wherein the first neural network is a deep convolutional neural network and the second neural network is a point cloud-based neural network.

10. A device for creating a digital map, the device comprising:
a processor, wherein the processor is configured to:
obtain surroundings sensor data captured in an overlapping manner during a measuring run of a physical system, the surroundings sensor data including:
first surroundings sensor data, which represents surroundings of the physical system as a first three-dimensional cloud of points; and
second surroundings sensor data, which represents the surroundings of the physical system as a two-dimensional arrangement of pixels;
register the first surroundings sensor data to the second surroundings sensor data so that each of the points of the cloud of the first surroundings sensor data is associated with a respective one of the pixels;
use a first neural network to:
process the first surroundings sensor data to identify a subset of the pixels of the second surroundings sensor data corresponding to a predefined object; and
based on the registration, select a subset of the points of the cloud of the first surroundings sensor data corresponding to the subset of the pixels, the selected subset of the points forming a three-dimensional representation of the predefined object;
extract, using a second neural network:
a subset of the subset of the points corresponding to characteristic features of the predefined object; and
descriptors of the one or more characteristic features;
based on the descriptors, align the subset of the subset of the points with a subset of another subset of points, which is of a second three-dimensional cloud of points; and
based on the alignment of the subset of the subset of the points with the subset of the another subset of points, stitch the first and second three-dimensional clouds of points to each other, thereby creating at least a part of a three-dimensional map.

11. A non-transitory computer-readable storage medium on which is stored a computer program including program code for creating a digital map, the program code, when executed by a computer, causing the computer to perform the following steps:
obtaining surroundings sensor data captured in an overlapping manner during a measuring run of a physical system, the surroundings sensor data including:
first surroundings sensor data, which represents surroundings of the physical system as a first three-dimensional cloud of points; and
second surroundings sensor data, which represents the surroundings of the physical system as a two-dimensional arrangement of pixels;
registering the first surroundings sensor data to the second surroundings sensor data so that each of the points of the cloud of the first surroundings sensor data is associated with a respective one of the pixels;
using a first neural network:
processing the first surroundings sensor data to identify a subset of the pixels of the second surroundings sensor data corresponding to a predefined object; and
based on the registration, selecting a subset of the points of the cloud of the first surroundings sensor data corresponding to the subset of the pixels, the selected subset of the points forming a three-dimensional representation of the predefined object;
extracting, using a second neural network:
a subset of the subset of the points corresponding to one or more characteristic features of the predefined object; and
descriptors of the one or more characteristic features;
based on the descriptors, aligning the subset of the subset of the points with a subset of another subset of points, which is of a second three-dimensional cloud of points; and based on the alignment of the subset of the subset of the points with the subset of the another subset of points, stitching the first and second three-dimensional clouds of points to each other, thereby creating at least a part of a three-dimensional map.

\* \* \* \* \*